United States Patent [19]

Tanaka

[11] Patent Number: 5,541,841
[45] Date of Patent: Jul. 30, 1996

[54] VEHICLE SPEED RESPONSIVE POWER STEERING SYSTEM WITH MEANS FOR ASSISTING STEERED STATE

[75] Inventor: Hiroaki Tanaka, Gotenba, Japan

[73] Assignee: Toyota Jidosha Kabushiki Kaisha, Toyota, Japan

[21] Appl. No.: 124,606

[22] Filed: Sep. 21, 1993

[30] Foreign Application Priority Data

Oct. 19, 1992 [JP] Japan .................................... 4-306033

[51] Int. Cl.$^6$ ........................................................ B62D 5/04
[52] U.S. Cl. ............................... 364/424.05; 180/446
[58] Field of Search ....................... 364/424.05; 180/79.1, 180/140, 141, 142, 143; 280/91

[56] References Cited

U.S. PATENT DOCUMENTS

| | | | |
|---|---|---|---|
| 4,754,829 | 7/1988 | Shimizu | 180/79.1 |
| 4,779,693 | 10/1988 | Takahashi et al. | 180/140 |
| 4,947,327 | 8/1990 | Kawagoe | 364/424.05 |
| 5,040,629 | 8/1991 | Matsuoka et al. | 364/424.05 |
| 5,076,381 | 12/1991 | Daido et al. | 364/424.05 |
| 5,257,828 | 11/1993 | Miller et al. | 364/424.05 |

FOREIGN PATENT DOCUMENTS

| | | |
|---|---|---|
| 60-67264 | 4/1985 | Japan . |
| 60-80967 | 5/1985 | Japan . |
| 63-41277 | 2/1988 | Japan . |
| 63-180566 | 7/1988 | Japan . |
| 1215667 | 8/1989 | Japan . |

Primary Examiner—Gary Chin
Attorney, Agent, or Firm—Cushman, Darby & Cushman

[57] ABSTRACT

In a power steering system of a vehicle, the assistance steering torque supplied by power means is generally increased along with increase of the hand steering torque, while the assistance steering torque is generally decreased at a rate along with an increase of vehicle speed that is decreased when the steering angle is greater than a threshold value determined therefor with rate of change of the steering angle being lower than a threshold value determined therefor.

6 Claims, 3 Drawing Sheets

5,541,841

VEHICLE SPEED RESPONSIVE POWER STEERING SYSTEM WITH MEANS FOR ASSISTING STEERED STATE

BACKGROUND OF THE INVENTION

1. Field of the Invention

The present invention relates to a power steering system, and more particularly, to a power steering system responsive to vehicle speed.

2. Description of the Related Art

The force required to turn a vehicle steering wheel is the greatest when the vehicle is stopped and decreases gradually therefrom as the vehicle runs faster. On the other hand, from the view point of steering stability of a vehicle, it is generally desirable that the force required to turn the steering wheel increases gradually as the vehicle runs at higher vehicle speed.

In view of these different requirements with respect to the performance of the steering system of a vehicle, it is known in the art of power steering to change the magnitude of the force exerted by the power steering means to the steering system for assisting the steering action by the driver according to vehicle speed so that said magnitude is decreased as the vehicle speed increases, as described in, for example, Japanese Patent Laid-open Publication 60-67264.

By such an arrangement of the power steering system, a light and comfortable steering action is available when a vehicle is driven at low speed wherein the stability performance of the steering system is of no substantial concern. During high speed driving of the vehicle, if the steering wheel turns so light that the steering system is liable to cause an oversteering action, the steering stability of the vehicle is lowered.

However, during the vehicle driving, it often happens that the vehicle runs along a long curved lane at high speed as on the expressway, with the steering wheel being held at a substantially turned condition. In this case, if the above-mentioned vehicle speed responsive power steering system is incorporated, because the vehicle is running at high speed, the magnitude of the force exerted by the power means for assisting the driver's steering action is low, and therefore, the driver must hold the steering wheel with his or her hands and arms generating a substantial force for a relatively long period.

SUMMARY OF THE INVENTION

In view of such drawback of the above-mentioned vehicle speed responsive power steering system, it is a primary object of the present invention to provide a vehicle speed responsive power steering system having an improved performance by which the driver's steering action during a high speed long turn is more effectively assisted by the power steering means without adversely affecting the inherently advantageous performance of a vehicle speed responsive power steering system.

It is another object of the present invention to provide an improved vehicle speed responsive power steering system with no substantial increase in hardware cost as compared with that of the conventional systems.

According to the present invention, the above-mentioned objects are accomplished by a power steering system for a vehicle having wheels and a steering wheel, comprising:

means for detecting hand steering torque applied to the steering wheel;

means for detecting steering angle;

means for detecting vehicle speed;

means for generating an assistance steering torque for assisting the hand steering torque for turning the steering vehicle wheels; and means for controlling the assistance steering torque generating means so that the assistance steering torque is generally increased along with an increase in the hand steering torque, while the assistance steering torque is generally decreased at a rate along with vehicle speed that is decreased when the steering angle is greater than a threshold value determined therefor with rate of change of the steering angle being lower than a threshold value determined therefor.

In the above-mentioned power steering system, the control means may control the resistance steering torque generating means so that the magnitude of the assistance steering torque is calculated as the product of a basic assistance steering torque, which generally increases along with increase of the hand steering torque, and a modification factor, which generally decreases along with increase of vehicle speed, the modification factor being determined according to a first performance curve prepared to depend upon vehicle speed for a first steering condition wherein steering angle is not greater than a threshold value determined therefor or a second performance curve prepared to depend upon vehicle speed for a second steering condition wherein steering angle is greater than the threshold value therefor and the rate of change of steering angle is not greater than a threshold value determined therefor.

In this case, the control means may control the assistance steering torque generating means so that, when the modification factor is changed between the first performance curve and the second performance curve, if the difference between the value of the modification factor according to the first performance curve and the value of the modification factor according to the second performance curve is greater than a moderate threshold amount determined therefor, the modification factor is changed in a stepwise fashion within the moderate threshold amount.

BRIEF DESCRIPTION OF THE DRAWING

In the accompanying drawing.

DESCRIPTION OF THE PREFERRED EMBODIMENT

In the following the present invention will be described in more detail with respect to an embodiment thereof with reference to the accompanying drawing.

Figure 1:
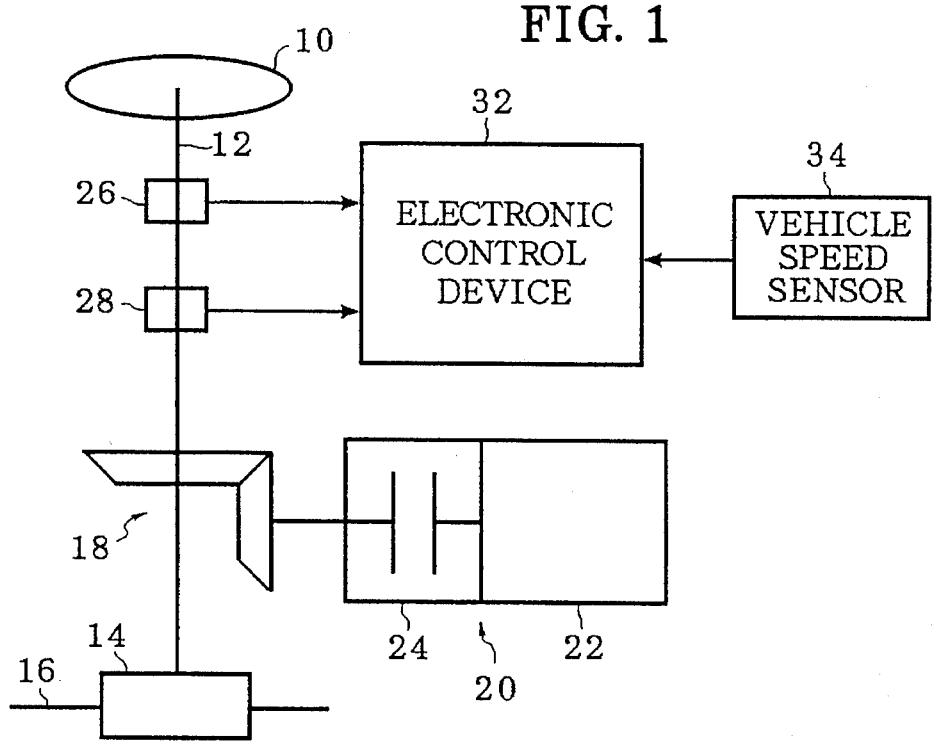
FIG. 1 is a schematic illustration of a power steering system of a vehicle, embodying the present invention in an electric power steering system.

Referring to FIG. 1, 10 is a steering wheel of a vehicle supported by a steering shaft 12 which is connected at another end thereof to a steering gear box 14 through which a steering rack bar 16 extends in a well known conventional manner. Turning the steering shaft 12 is assisted, through a set of bevel gears 18, by power means 20 including an electric motor 22 and an electromagnetic clutch 24. A steering angle sensor 26 detects the steering angle of the steering shaft 12. A hand torque sensor 28 detects the hand steering torque applied to the steering shaft 12 by the hands of a driver. The power means 20 operates under the control of an electronic control means 32 which receives a signal representing steering angle from the steering angle sensor 26, a signal representing the hand steering torque from the hand torque sensor 28, and a signal representing vehicle speed from a vehicle speed sensor 34.

Figure 2:
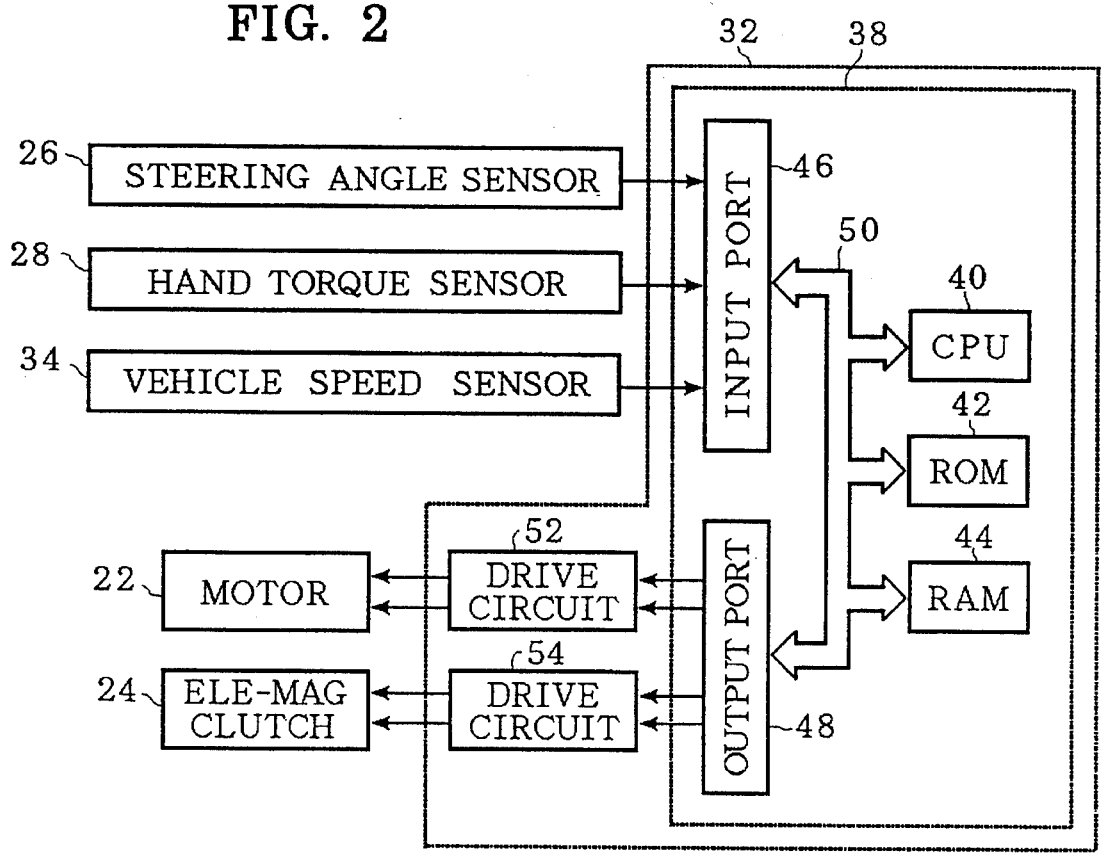
FIG. 2 is a schematic illustration of the control system of the electric power steering system shown in FIG. 1.

FIG. 2 shows an electronic control system for controlling the operation of the electric power steering system shown in FIG. 1. The electronic control means 32 comprises a micro computer 38 of a known general construction including a central processing unit (CPU) 40, a read only memory (ROM) 42, a random access memory (RAM) 44, input port means 46, output port means 48 and a bilateral common bus 50.

The signals from the steering angle sensor 26, the hand torque sensor 28 and the vehicle speed sensor 34 are supplied to the micro computer 38 through the input port means 46. The micro computer 38 caries out control calculations based upon these input signals as described hereinunder, and outputs control signals through the outputs port means 48 for the electric motor 22 and the electromagnetic clutch 24, such control signals being supplied to drive circuits 52 and 54 for the electric motor 22 and the electromagnetic clutch 24, respectively.

Figure 3:
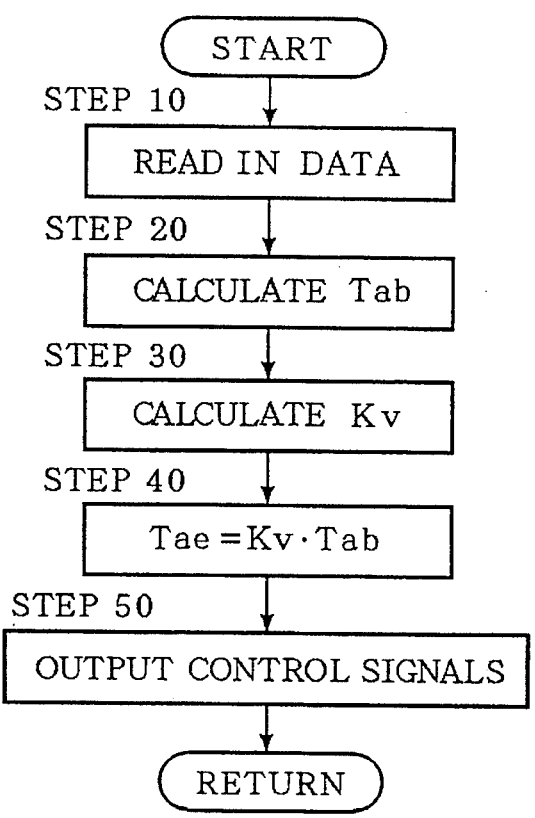
FIG. 3 is a flowchart showing a main control routine carried out by the control system shown in FIG. 2 to operate the electric power steering system shown in FIG. 1.

The basic operation of the control system shown in FIG. 2 will be described according to the flowchart shown in FIG. 3.

When the operation of the control system is started with the start up of the vehicle by switching on the ignition switch (not shown), in step 10 the input data such as the steering angle, hand steering torque and vehicle speed are read.

Figure 4:
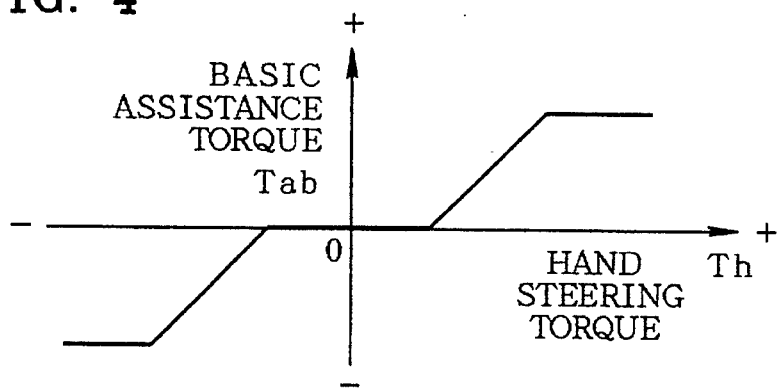
FIG. 4 is a graph showing a relation between the basic amount of the assistance steering torque and the hand steering torque.

Then, in step 20, the magnitude of the basic assistance steering torque Tab is calculated based upon the detected value of the hand steering torque Th and a map stored in ROM 42, which represents a relation between the basic assistance steering torque Tab and the hand steering torque Th, as shown in FIG. 4.

Figure 5:
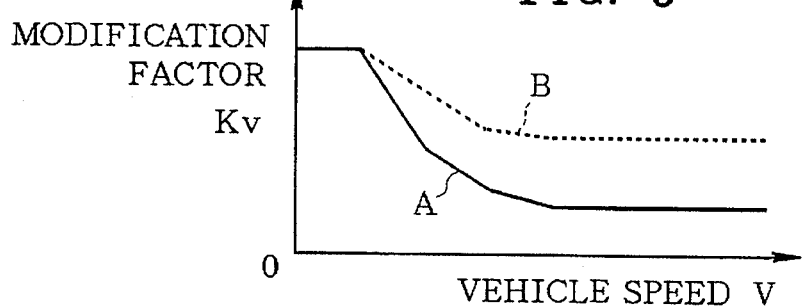
FIG. 5 is a graph showing a relation between the modification factor for the basic assistance steering torque and vehicle speed.

Then, in step 30, the magnitude of the modification factor Kv is calculated based upon the detected value of vehicle speed V and a map stored in ROM 42, which represents such a relation between the modification factor Kv and vehicle speed V as shown in FIG. 5. As is described hereinunder, curve A or B is selectively used according to certain steering conditions which relate to the essence of the present invention.

Then, in step 40, an execution assistance steering torque Tae, which is supplied by the power means 20 to the steering shaft 12, is calculated by multiplying Tab by Kv.

Then, in step 50, the control signals are output the drive circuits 52 and 54 so that the electromagnetic clutch 24 is engaged and the motor 22 is driven.

As will be appreciated from the graphs shown in FIGS. 4 and 5, when the hand steering torque Th increases in a first rotational direction (+) or in a second rotational direction (−) opposite to said first rotational direction beyond a certain neutral non sensitive range, the basic assistance steering torque Tab increases gradually in the first rotational direction or in the second rotational direction along with an increase of the absolute value of the hand steering torque, while, when the vehicle speed V increases beyond a certain small non sensitive range, the modification factor Kv gradually decreases along with increase of the vehicle speed. Therefore, the execution assistance steering torque Tae supplied to the steering shaft 12 is increased when the driver exerts greater steering torque to the steering wheel so that the steering wheel can be turned by the driver with little increase of the reaction torque. Further, because the magnitude of the assistance steering torque supplied to the steering shaft is relatively decreased as the vehicle speed increases, the reaction of the steering system against the steering action of the driver during high speed running is maintained relatively strong, thereby ensuring stabilized high speed driving of the vehicle.

Figure 6:
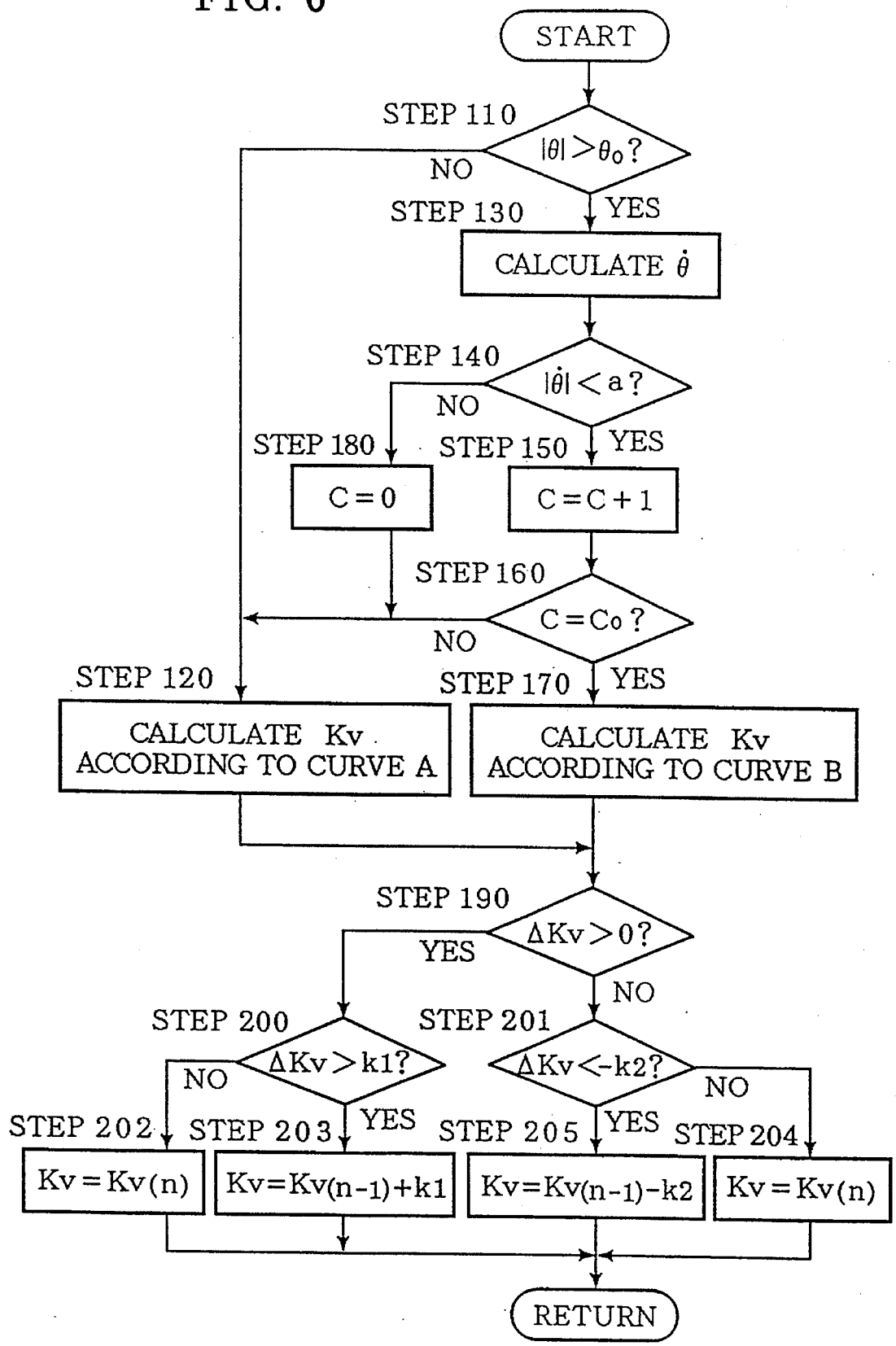
FIG. 6 is a flowchart showing a subroutine carried out by the control system shown in FIG. 2 to modify the relation between the modification factor and vehicle speed shown in FIG. 5 according to a combination of steering angle and the rate of change of steering angle.

The essential point of the present invention will be now described in reference to the flowchart of FIG. 6 and also FIG. 5. The control steps shown in FIG. 6 is carried out as a subroutine in step 30 of the main routine.

Based upon the steering angle $\Theta$ detected in step 10, in step 110 it is judged if the vehicle steering wheel is turned. When the steering angle in a first steering direction is expressed in "plus", while the steering angle in a second steering direction opposite to said first steering direction is expressed in "minus", the above judgment is done by judging if the absolute value of $\Theta$ is greater than a threshold value $\Theta o$ determined therefor. If the answer is no, i.e. the vehicle steering wheel is not substantially turned, the control proceeds to step 120, and the power steering is performed according to the prior art manner of by selecting the curve A in FIG. 5, so that the modification factor Kv is substantially decreased along with increase of vehicle speed.

If, on the other hand, the answer in step 110 is yes, the control proceeds to step 130, and the rate of change of the steering angle $\Theta$ is calculated. The rate will be readily available from the difference between the value of the steering angle at the current scanning process through this control routine and that in the preceding scanning process.

Then, in step 140, it is judged if the absolute value of the change rate of steering angle, $|\dot{\Theta}|$, is smaller than a threshold value "a" determined therefor. If the answer is yes, the control proceeds to step 150, and a count number C is increased by one. Then the control proceeds to step 160.

In step 160, it is judged if the count number C has reached a threshold value Co determined therefor. If the answer is yes, the control proceeds to step 170. The fact that the control has reached step 170 means that the steering wheel is maintained for more than a certain period in a substantially static state of having been turned a substantial angle, as will occur when the vehicle is running through a long curve of the expressway, generally at high speed. Therefore, in step 170, the curve B of FIG. 5 is selected to calculate the modification factor Kv. As will be appreciated in FIG. 5, the curve B provides substantially greater values for Kv than the curve A does. Therefore, in this case, the execution assistance steering torque Tae supplied by the power means 20 to the steering shaft 12 is not so much decreased according to an increase of vehicle speed as in the case of calculating Kv according to the curve A. Therefore, during such steered driving of the vehicle along a long curve of the expressway at high speed, the reaction torque which the steering wheel applies against the driver is substantially lowered, thus improving the drive feeling of the vehicle.

When the answer in step 140 is no, it means that the steering wheel is in a substantially turned state and is still being turned in either direction. In this case, the curve A should still be selected. In this case, the control proceeds toward step 120. Further, if the count C has once started in a previous scanning cycle with the judgement in step 140 having been temporarily yes, the count C should desirably be cancelled. Therefore, the control proceeds once to step 180, where the count C is cancelled, and then the control proceeds to step 120. (At the start of the control, the count C is reset to zero, according to the general operation of this kind of devices.) Further, as long as the answer in step 160 is no, the control proceeds to step 120, so that the curve A is still used.

After the curve A or B is selected in step 120 or 170, it is further desirable that certain control be executed to cause an abrupt change of Kv when the selection was switched over between the curves A and B. Therefore, the control proceeds to step 190, and it is judged if the difference ΔKv between the current Kv and the preceding Kv is greater than zero. If the answer is yes, i.e., if ΔKv is positive, the control proceeds to step 200, whereas is the answer is no, i.e., if ΔKv is zero or negative, the control proceeds to step 201.

In step 200, it is judged if ΔKv is greater than a certain moderate difference value k1. If the answer is no, the control proceeds to step 202, and the current Kv, i.e., $Kv_n$, is used as it is. However, if the answer in step 200 is yes, the control proceeds to step 203, and Kv is increased from the preceding Kv, i.e. $Kv_{n-1}$, only by k1.

Similarly, in step 201, it is judged if the absolute value of ΔKv is greater than a certain moderate difference value k2 (positive). If the answer in step 201 is no, the control proceeds to step 204, and the current Kv, i.e., $Kv_n$, is used as it is. However, if the answer in step 201 is yes, the control proceeds to step 205, and the absolute value of Kv is increased from the preceding Kv, i.e., $Kv_{n-1}$, only by k2.

Although the invention has been described in detail in the above with respect to a particular embodiment thereof, it will be apparent for those skilled in the art that various alteration, modification and/or omission is possible with respect to the shown embodiment without departing from the spirit of the present invention.

I claim:

1. A power steering system in a vehicle having a steering wheel, comprising:

means for detecting steering angle;

means for detecting vehicle speed;

means for generating an assistance steering torque for assisting a hand steering torque applied to said steering wheel for turning said vehicle; and means for controlling said assistance steering torque generating means so that said assistance steering torque increases along with an increase in said hand steering torque, said controlling means further controlling said assistance steering torque generating means so that said assistance steering torque decreases along with an increase in vehicle speed, wherein a rate of decrease in said assistance steering torque is reduced if said steering angle is greater than a first threshold value and a rate of change of said steering angle is less than a second threshold value.

2. A power steering system in a vehicle having a steering wheel, comprising:

means for detecting steering angle;

means for detecting vehicle speed;

means for generating an assistance steering torque for assisting a hand steering torque applied to said steering wheel for turning said vehicle; and means for controlling said assistance steering torque generating means so that said assistance steering torque increases along with an increase in said hand steering torque, said controlling means further controlling said assistance steering torque generating means so that said assistance steering torque decreases along with an increase in vehicle speed, wherein a rate of decrease in said assistance steering torque is reduced if said steering angle is greater than a first threshold value and a rate of change of said steering angle is less than a second threshold value, and wherein said controlling means controls said assistance steering torque generating means so that a magnitude of said assistance steering torque is calculated as a product of a basic assistance steering torque, which increases along with increase of said hand steering torque, and a modification factor, which decreases along with an increase in said vehicle speed, said modification factor being determined according to a first performance curve that is based upon said vehicle speed for a first steering condition wherein said steering angle is not greater than said first threshold value determined therefor or a second performance curve based upon said vehicle speed for a second steering condition wherein said steering angle is greater than said first threshold value and said rate of change of said steering angle is not greater than said second threshold value.

3. A power steering system according to claim 2, wherein said controlling means controls said assistance steering torque generating means so that, when said modification factor changes between said first performance curve and said second performance curve, if a difference between a value of said modification factor according to said first performance curve and a value of said modification factor according to said second performance curve is greater than a third threshold amount, said modification factor is changed in a stepwise fashion.

4. A vehicle steering assembly comprising:

a steering wheel;

a torque detector for detecting an amount of torque applied by a driver to said steering wheel;

a steering wheel angle detector for detecting a steering angle;

an assistance steering torque generator providing an assistance steering torque to assist said torque applied to said steering wheel by said driver; and controller operatively coupled to said assistance steering torque generator and controlling said assistance steering torque generator so that said assistance steering torque increases along with an increase in said torque applied by said driver, said controller further controlling said assistance steering torque generator so that said assistance steering torque decreases along with an increase in vehicle speed, wherein a rate of decrease in said assistance steering torque is reduced if said steering angle is greater than a first threshold value and a rate of change of said steering angle is less than a second threshold value.

5. A power steering system according to claim 4, wherein said controller controls said assistance steering torque generator so that a magnitude of said assistance steering torque is calculated as a product of a basic assistance steering torque, which increases along with increase of said torque applied by said driver, and a modification factor, which decreases along with an increase in said vehicle speed, said modification factor being determined according to a first performance curve that is based upon said vehicle speed for a first steering condition wherein said steering angle is not greater than said first threshold value determined therefor or a second performance curve based upon said vehicle speed for a second steering condition wherein said steering angle is greater than said first threshold value and said rate of change of said steering angle is not greater than said second threshold value.

6. A power steering system according to claim 5, wherein said controller controls said assistance steering torque generator so that if said modification factor is changed between said first performance curve and said second performance curve and a difference between a value of said modification factor according to said first performance curve and a value of said modification factor according to said second performance curve is greater than a third threshold amount, said modification factor is changed in a stepwise fashion.

* * * * *